(12) United States Patent
Miller

(10) Patent No.: US 8,494,445 B2
(45) Date of Patent: Jul. 23, 2013

(54) FLEXIBLE COVERAGE AREAS FOR FORWARD LINK SIGNALS IN A SPOT BEAM SATELLITE COMMUNICATION SYSTEM

(75) Inventor: Mark Miller, Vista, CA (US)

(73) Assignee: ViaSat, Inc., Carlsbad, CA (US)

( * ) Notice: Subject to any disclaimer, the term of this patent is extended or adjusted under 35 U.S.C. 154(b) by 331 days.

(21) Appl. No.: 13/019,841

(22) Filed: Feb. 2, 2011

(65) Prior Publication Data

US 2011/0189948 A1 Aug. 4, 2011

Related U.S. Application Data

(60) Provisional application No. 61/301,164, filed on Feb. 3, 2010.

(51) Int. Cl.
*H04B 7/185* (2006.01)
(52) U.S. Cl.
USPC ......... 455/13.4; 455/522; 455/69; 455/127.2; 455/127.3; 370/318; 342/373
(58) Field of Classification Search
USPC ............. 455/13.4, 69, 522, 15, 24, 509, 3.02, 455/12.1, 11.1, 13.2, 13.3, 67.16, 115.1, 455/136, 194.2, 245.1, 341, 311, 4.1, 127.1, 455/127.2, 127.3, 127.5, 138; 370/315, 332, 370/334; 342/373, 382, 354
See application file for complete search history.

(56) References Cited

U.S. PATENT DOCUMENTS

| | | | |
|---|---|---|---|
| 4,907,004 A * | 3/1990 | Zacharatos et al. | 342/373 |
| 5,825,762 A * | 10/1998 | Kamin et al. | 370/335 |
| 5,917,371 A * | 6/1999 | Chesarek et al. | 330/124 R |
| 5,995,495 A | 11/1999 | Sampson | |
| 6,442,148 B1 | 8/2002 | Adams et al. | |
| 7,099,624 B1 | 8/2006 | Sherman | |
| 8,331,329 B2 * | 12/2012 | Sayegh | 370/335 |
| 2006/0046638 A1 | 3/2006 | Takeuchi et al. | |
| 2010/0120356 A1 | 5/2010 | Jin et al. | |
| 2010/0148860 A1 * | 6/2010 | Rhodes et al. | 330/2 |
| 2010/0164782 A1 * | 7/2010 | Saha et al. | 342/174 |
| 2010/0177678 A1 * | 7/2010 | Sayegh | 370/315 |
| 2011/0189947 A1 * | 8/2011 | Miller | 455/12.1 |

OTHER PUBLICATIONS

Tanaka M et al: "Experimental Fixed and Mobile Multibeam Satellite Communications System" NTT Radio Communication System Laboratories, 1-2356 Take. Yokosuma, Kanagawa, Japan 238-03, Jun. 11, 1989, pp. 1587-1594, 8 pages.
European Search report for European Application No. 11002789.3, mailed on Jun. 5, 2012, 7 pages.
Non-Final Office Action for U.S. Appl. No. 13/019,842, mailed on Mar. 19, 2012; 8 pages.
Final Office Action of Aug. 8, 2012 for U.S. Appl. No. 13/019,842, 11 pages.

* cited by examiner

*Primary Examiner* — Tan Trinh
(74) *Attorney, Agent, or Firm* — Kilpatrick Townsend & Stockton LLP

(57) ABSTRACT

Conventional spot beam satellites transmit downlink beams that each correspond to a separate and unique uplink signal. Power available for each downlink beam is typically set by an associated amplifier on the satellite, and total transmit power cannot be dynamically distributed across different spot beams. An embodiment of the present invention overcomes this distribution limitation by using multiple replicas of a single signal as input to a multi-port amplifier that allows transmit power to be dynamically distributed across the different spot beams. The replicas may be de-correlated through techniques such as selectively delaying some of the replicas. This power distribution effectively allows dynamic allocation of capacity between areas serviced by different beams. Offered load in different beams can be predicted and used to set the attenuation values appropriately and the attenuation values may also be controlled remotely.

10 Claims, 8 Drawing Sheets

Beam capacity adjustment: East Coast Primetime

Beam capacity adjustment: West Coast Primetime

FLEXIBLE COVERAGE AREAS FOR FORWARD LINK SIGNALS IN A SPOT BEAM SATELLITE COMMUNICATION SYSTEM

CROSS-REFERENCES TO RELATED APPLICATIONS

The present application claims benefit of priority under 35 U.S.C. §119(e) of U.S. Provisional Application No. 61/301,164, filed Feb. 3, 2010, titled "Flexible Coverage Areas for a Spot Beam Satellite Communications System—Forward and Return Link," the content of which is incorporated herein by reference in its entirety for all purposes.

The present application is filed concurrently with U.S. Nonprovisional patent application Ser. No. 13/019,842, filed Feb. 2, 2011, now U.S. Pat. No. 8,401,467, titled "Flexible Coverage Areas for Return Link Signals in a Spot Beam Satellite Communication System," the content of which is incorporated herein by reference in its entirety for all purposes.

FIELD OF THE INVENTION

The present invention relates generally to satellite communications systems. More particularly, the present invention relates to methods and apparatuses for providing dynamic power distribution for forward link signals at a spot beam satellite.

BACKGROUND

Spot beam satellites are effective for the transmission and reception of unicast and multicast data. In typical spot beam satellites, many smaller spot beams are used to provide coverage for a larger area that is defined by the union of the areas covered by each of the smaller spot beams. An example is depicted in FIGS. 1A-1C, which show how a number of spot beams, such as individual spot beam 102, provide satellite coverage over a large coverage area 104.

FIG. 2 is a simplified diagram of a forward link of a typical bent pipe spot beam satellite system using a hub-spoke architecture. The depicted hardware connects one user beam 224 (or spot beam) to a gateway (GW) terminal 207 in a GW beam 208. The GW terminal 207 transmits data through a satellite 206 down to a plurality of user terminals (UT's) 226 in the user beam 224. The satellite 206 in this example is simplified but shows key elements of one forward link signal pathway including a receive (Rx) antenna 212, a low noise amplifier (LNA) 214, a frequency converter 216, a high power amplifier (HPA) 218, and a transmit (Tx) antenna 220. Many UT's 226 can operate in the same user beam 224 and receive data from a single GW transmission 210 via multiplexing of the data into a single aggregated downlink signal 222 (e.g., time division multiplexing (TDM), frequency divisional multiplexing (FDM), and the like). Typically each UT only processes the data in the stream that is addressed to itself. A typical satellite 206 can have a number of these sets of pathway hardware connecting a number of GW's to a number of user beams.

Some conventional spot beam satellites replace the HPA 218 shown in FIG. 2 with a multi-port amplifier (MPA). As shown in FIG. 3, a MPA can include a hybrid matrix (HM) 332, HPA's 318a, 318b, 318N, and an inverse hybrid matrix 334. This configuration can provide a higher power HPA by using several HPA's 318a, 318b, 318 N in parallel. When used in this manner, an input signal s(t) is applied to one input port, and all other inputs are terminated (no input signal). The output signal y(t) is present on the first output port, and all other ports are terminated with essentially no signal present. The motivation is to make a higher power HPA by combining N HPA's. In this configuration, the MPA can be used to increase transmit power to a single user beam.

Another conventional use of a MPA is depicted in FIG. 4, which shows a HM 432, HPA's 418a, 418b, 418 N, and an inverse hybrid matrix 434. As shown in this figure, the N input signals $s_1(t) \ldots s_N(t)$ are different data streams with the content of each stream targeted for different sets of UT's in different spot beams. The input signals $s_j(t) \ldots s_N(t)$ may originate, for example, from different GW terminals. The output signals $y_1(t) \ldots y_N(t)$ are amplified versions of the input signals. Different data content is provided to each of the N beams. In this configuration, the MPA can be used to share total transmit power amongst the distinct user beams.

A single user beam 224, as shown in FIG. 2, typically covers a small subset of a desired coverage area. Many user beams are employed in a manner similar to that depicted in FIG. 1 to provide service to a larger coverage area. Each of the user beams is serviced by a GW, and a number of user beams may be serviced by the same GW by use of different frequencies and/or polarizations. The total coverage area is the union of the areas covered by the individual user spot beams. This coverage area is the region where satellite service can be offered to customers. This coverage area is fixed and is selected during a satellite design process.

Satellite procurement, design, construction, launch, and test is a lengthy process. This process typically takes up to four years or more. The coverage area must be specified very early on in this process. In many instances, the desired coverage area is not well known at these early stages of satellite design. An educated guess must be made as to where the best coverage areas might be. If one chooses incorrectly, a coverage area may be selected that has few potential customers. This is clearly an undesirable consequence.

This problem is further complicated by the long operational lifetime of satellites. Satellites typically have an operational lifetime of 15 years or more. During this time, target services areas can change dramatically. This can occur due to the development of ground infrastructure (e.g., wireless and fiber network build outs), re-purposing of the satellite, movement of the satellite to a different orbit slot, and the like. The satellite spot beams, however, and thus the coverage areas, are fixed in location and typically cannot be modified despite these changes.

Further, offered load at different spot beams can vary dramatically over short time periods. For example, a satellite system that covers the continental United States may experience busy hours on the East Coast that correspond to non-busy hours on the West Coast.

Thus, there is a need for improved spot beam satellites that allow for modification of capacity and coverage areas to adjust to short term demands and also throughout the operational lifetime of the satellite.

SUMMARY

Some embodiments of the present invention provide methods and apparatuses for providing flexible coverage areas and flexible capacity for forward links of a spot beam satellite. This can allow coverage areas to be defined later in the design process and allow coverage areas and capacity to be changed during the operational lifetime of the satellite.

In accordance with an embodiment of the invention, a method for distributing transmit power of a forward link signal at a spot beam satellite includes receiving a forward link signal from a gateway, generating multiple versions of the forward link signal, and de-correlating the multiple versions of the forward link signal. The method also includes selectively attenuating at least one of the multiple versions of the forward link signal and, after the step of selectively attenuating, amplifying the multiple versions of the forward link signal using a multi-port amplifier to generate multiple amplified signals. The method also includes transmitting the multiple amplified signals to multiple spot beams.

In accordance with another embodiment of the invention, a method for distributing transmit power of a forward link signal at a spot beam satellite includes receiving a forward link signal from a gateway, generating multiple versions of the forward link signal, and delaying at least one of the multiple versions of the forward link signal. The method also includes selectively attenuating at least one of the multiple versions of the forward link signal and, after the step of selectively attenuating, amplifying the multiple versions of the forward link signal using a multi-port amplifier to generate one or more amplified signals. The step of selectively attenuating may use attenuation values received from a source remote from the spot beam satellite after the spot beam satellite has been deployed in space. The method also includes transmitting the one or more amplified signals as one or more spot beams.

In accordance with yet another embodiment of the invention, a spot beam satellite configured to allow dynamic distribution of transmit power across forward link signals includes an antenna configured to receive a forward link signal from a gateway, and a 1-to-N splitter configured to generate multiple versions of the forward link signal received from the gateway. The spot beam satellite also includes one or more de-correlation elements configured to de-correlate the multiple versions of the forward link signal received from the gateway, and one or more attenuators configured to attenuate the multiple versions of the forward link signal received from the gateway. The spot beam satellite also includes a multi-port amplifier configured to amplify the multiple versions of the forward link signal received from the gateway to generate one or more amplified signals, and a transmitter configured to transmit the one or more amplified signals as one or more spot beams.

Numerous benefits are achieved using the present invention over conventional techniques. For example, in one embodiment delayed and attenuated versions of a signal are input to a multi-port amplifier. This allows transmit power to be distributed across different spot beams. The versions of the signal may be attenuated using programmable attenuators. This allows the transmit power to be dynamically re-distributed across the different spot beams. Depending upon the embodiment, one or more of these benefits may exist. These and other benefits are described throughout the specification and more particularly below.

BRIEF DESCRIPTION OF THE DRAWINGS

An understanding of the nature and advantages of the present invention may be realized by reference to the following drawings. In the drawings, similar components or features may have the same reference label. Further, various components of the same type may be distinguished by following the reference label with a second label that distinguishes among the similar components. If only the first reference label is used in the specification, the description is applicable to any one of the similar components having the same reference label irrespective of the second reference label.

DETAILED DESCRIPTION

Some embodiments of the present invention provide methods and apparatuses for providing flexible coverage areas and flexible capacity for forward links of a spot beam satellite. In one embodiment, for example, a multi-port amplifier uses delayed and attenuated versions of a signal to dynamically distribute transmit power between user beams. This allows transmit power to be distributed amongst the user beams in any desired proportion.

Figure 5:
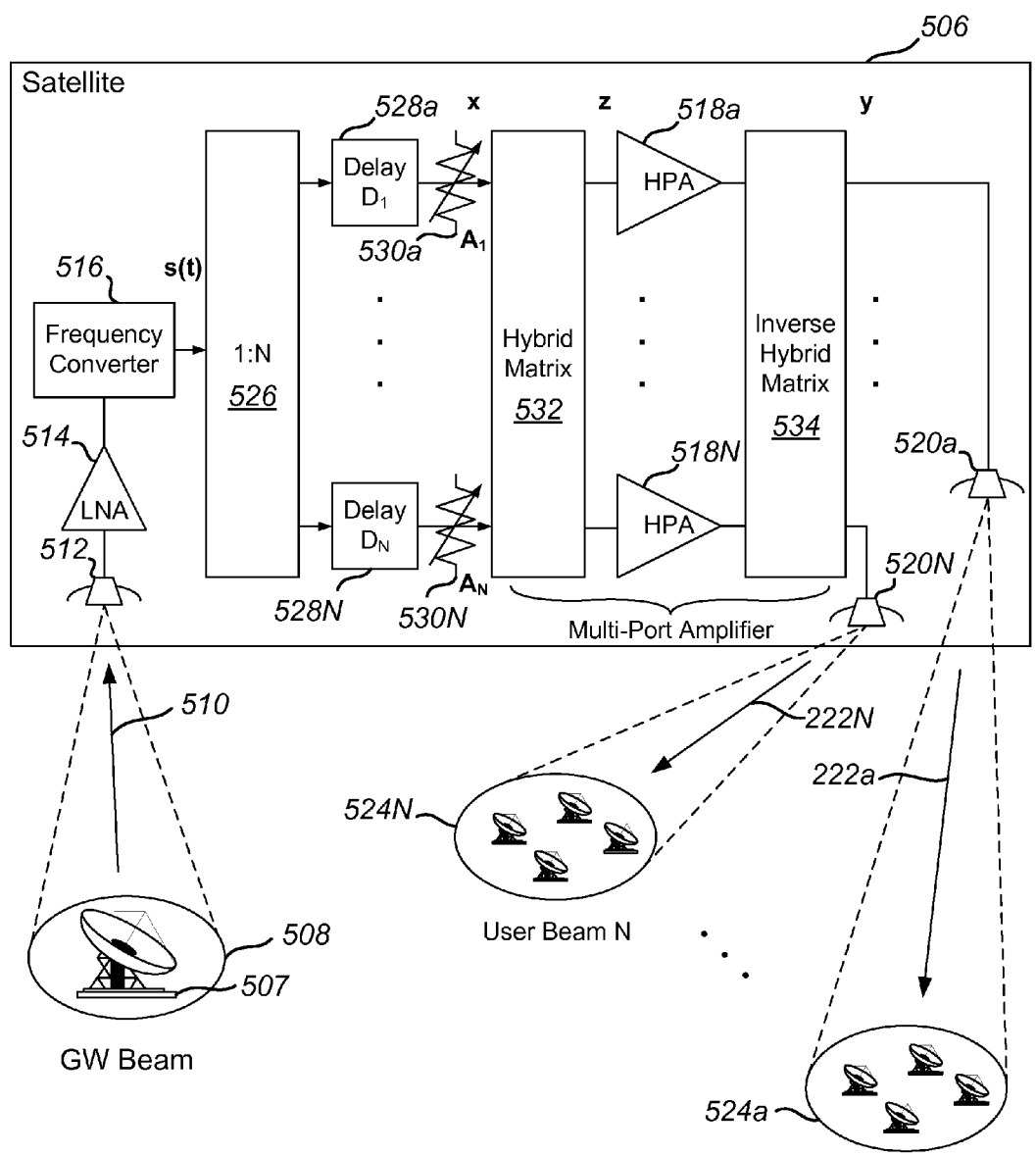
FIG. 5 is a simplified diagram of a forward link of a spot beam satellite in accordance with an embodiment of the invention.

FIG. 5 is a simplified diagram of a forward link of a spot beam satellite in accordance with an embodiment of the invention. This figure shows a group of N user beams 524a to 524N (where N=2, 3, . . . ) connected to a GW terminal 507 in gateway beam 508 through a satellite 506. The satellite 506 in this diagram is simplified but shows the components relevant to the description. In an embodiment, the N user beams 524a, . . . 524N may use the same spectrum. The N user beams 524a, . . . 524N can all be formed via the same satellite Tx antenna using different feeds, or they can be formed by different Tx antennas 520a, . . . 520N. Furthermore, the size of the reflectors used to form the N beams 524a, . . . 524N and hence the antenna directivity need not be the same for each of the beams. The N user beams 524a, . . . 524N form a beam group. The location of each of the beams in the beam group may be selected and fixed during the design phase of the satellite.

The forward link signal 510 originates from the GW terminal and is received by the satellite 506 through the Rx antenna 512. After conventional low noise amplification using LNA 514 and frequency conversion using frequency converter 516, the signal s(t) is split into N copies via a 1:N power divider 526. In one embodiment, delay elements 5281, . . . 528N are used to de-correlate the N inputs to the hybrid matrix (HM) 532. Each output of the power divider 526 is delayed by an amount $D_n$ using delay elements 528a, . . . 528N and attenuated by an amount $A_n$ using the programmable attenuators 530a, . . . 530N. In an alternative embodiment, one or more of the programmable attenuators 530a, 530N may be disposed before the delay elements 528a, . . . 528N such that outputs of the power divider 526 are attenuated by an amount $A_n$ before being delayed by an amount $D_n$. The values for the programmable attenuators 530a, . . . 530N can be uplinked to the satellite 506 via a command link that originates from a remote location (e.g., a control station). A command receiver and control processor (not shown) on the satellite 506 can receive these attenuation values and set the programmable attenuators 530a, . . . 530N accordingly. An attenuation value of $A_n=1$ may provide no attenuation of the signal and a large value of $A_n$ may provide a large attenuation of the signal. In practice, $D_1$ need not be present (can be a zero delay). The elements $D_2$ through $D_N$ provide different values to de-correlate the N inputs to the HM 532. Other techniques can be used to de-correlate the signals in accordance with embodiments of the invention.

The HM 532 may distribute a signal from an input port to each of its output ports that is equal in level but with differing phase shift. The signal at the output port of the HM 532 has contributions from the input signal on each input port. When the input signals to the HM 532 are uncorrelated, the power out of the HM 532 will be the same at each output port for any set of N input signals. The input delays $D_1$ . . . $D_N$ may be selected to provide a de-correlated input condition. The input power to each of the HPA's 518a, . . . 518N will be equal to each other regardless of the selected attenuator values $A_1$ . . . $A_N$. The HPA's 518a, . . . 518N provide matched gain and phase shift for each of the N signals out of the hybrid matrix. Inverse hybrid matrix 534 may be similar to the HM 532 in that it may distribute a signal from an input port to each of the output ports that is equal in level but with differing phase shift. The phase shifts through the inverse hybrid matrix 534 are set so as to undo the scrambling of the signals performed by the HM 532.

Figure 1A:
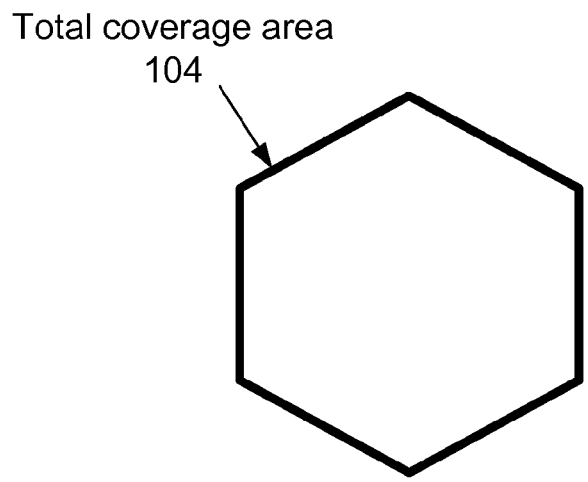
FIGS. 1A-1C are simplified diagrams showing how a number of spot beams provide satellite coverage over a large coverage area.
Figure 1B:
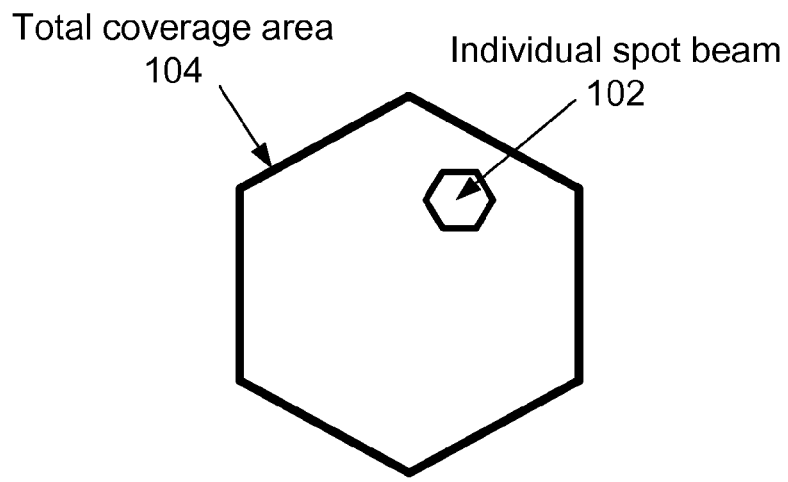
Figure 1C:
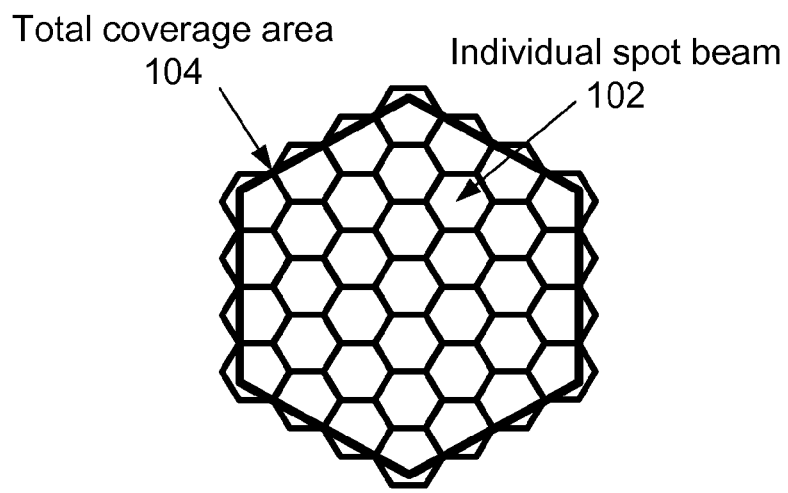
Figure 2:
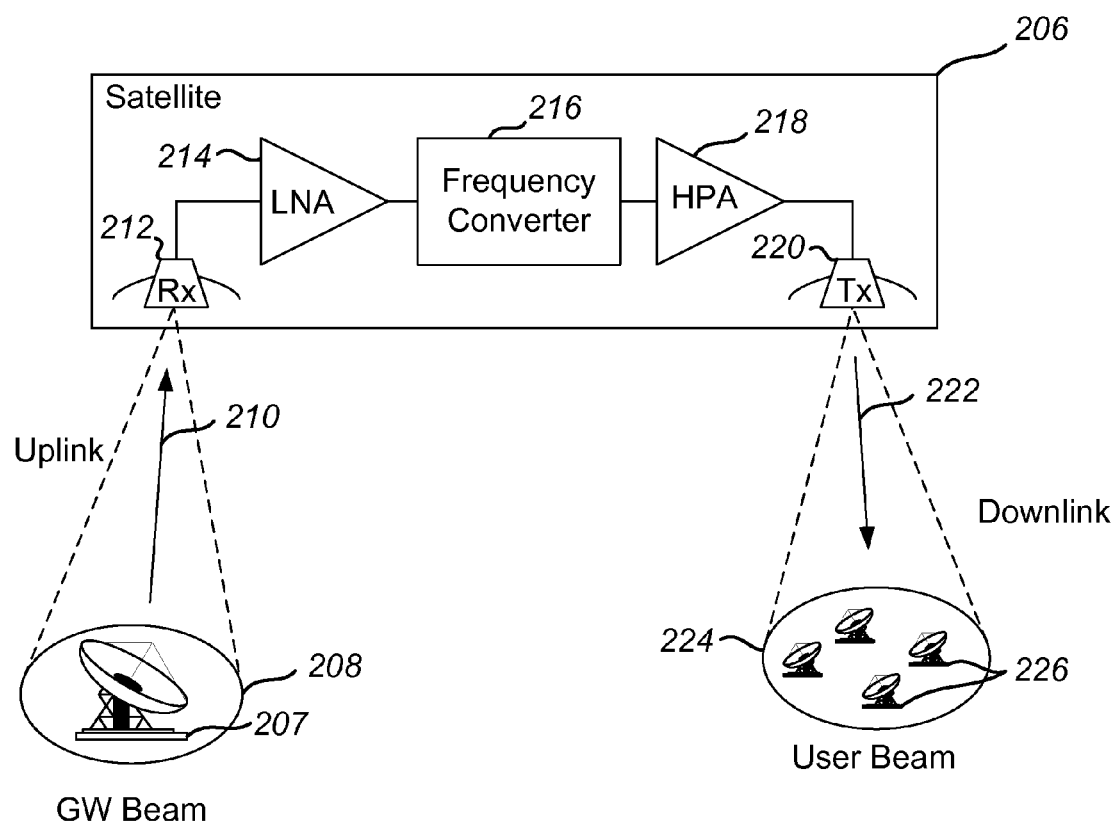
FIG. 2 is a simplified diagram of a forward link of a typical bent pipe spot beam satellite system using a hub-spoke architecture.
Figure 3:
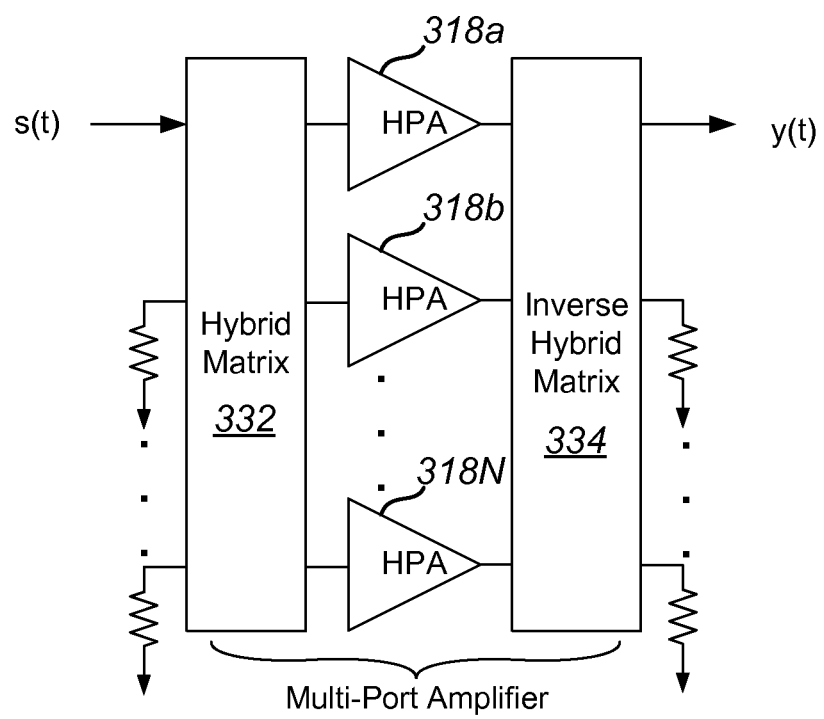
FIG. 3 is a simplified diagram of a conventional multi-port amplifier used to amplify a single signal.
Figure 4:
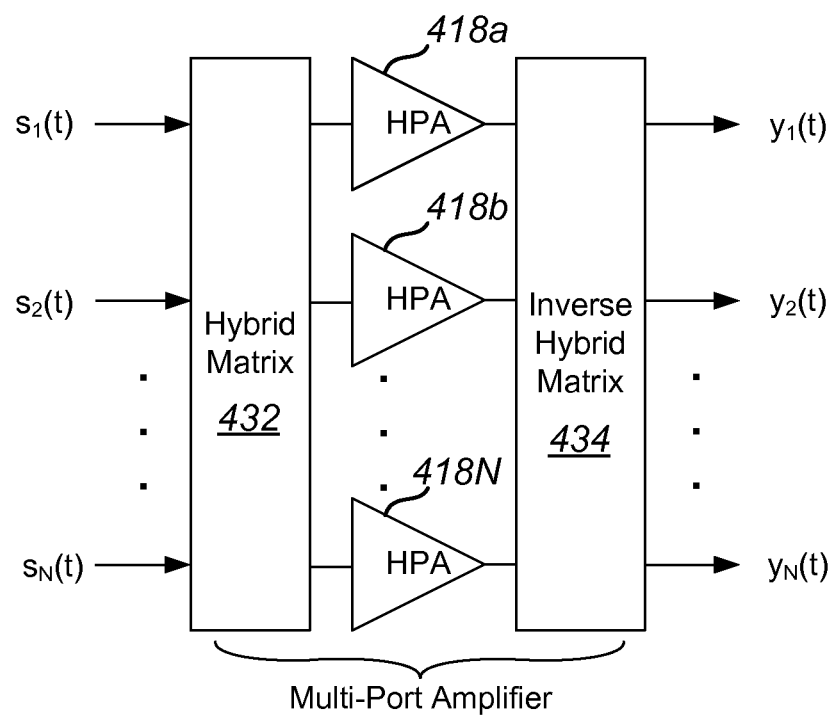
FIG. 4 is a simplified diagram of another conventional multi-port amplifier used to amplify a number of signals.

Embodiments of the present invention are distinguishable from the conventional use of MPA's illustrated in FIGS. 3-4. In embodiments of the present invention, the signals are de-correlated through specific processing (e.g., the delay elements). Also, embodiments of the present invention provide the same data content to all N MPA inputs at adjustable levels. In contrast, in the configuration of FIG. 3 the MPA inputs may be considered to be automatically de-correlated since only one input port has a signal applied. Similarly, in the configuration of FIG. 4 the inputs $s_1(t)$ . . . $s_N(t)$ may be considered to be automatically de-correlated since all N signals consist of different data.

Following is an example of how the satellite shown in FIG. 5 may be used in accordance with an embodiment of the invention. If the uplink signal 510 at the input to the power divider 526 is denoted s(t), the output signals from the inverse hybrid matrix 534 will be an amplified and delayed version of s(t). However, each output signal will be attenuated by a level $A_n$. If g is the power gain of each HPA 518a, . . . 518N, and $A_n$ is the power attenuation of the $n^{th}$ attenuator 530n, then the output signal from the $n^{th}$ port of the inverse hybrid matrix 534 can be determined using the equation:

$$y_n(t) = \sqrt{\frac{g}{A_n}} \cdot s(t - D_n) \quad (1)$$

The average power can be determined using the equation:

$$E[|y(t)|^2] = \frac{g}{A_n} P_s \quad (2)$$

where $P_s$, is the power of the input signal s(t). As this example illustrates, the attenuator settings $A_1$ . . . $A_N$ can be used to distribute the signal power amongst the user beams 524a, . . . 524N in any proportion desired. As an example, setting $A_n=1$ (no attenuation) and all other attenuators to a large value will place the power of the parallel HPA's 518a, . . . 518N into beam n. This effectively turns beam n "on" and all other beams in the beam group "off". As another example, selecting all of the attenuator settings to be equal will result in a equal distribution of power across all user beams 524a, . . . 524N. Note that equal power does not necessarily mean equal EIRP, because the gain of the Tx antennas 520a, . . . 520N used to generate the N user beams 524a, . . . 524N is not necessarily equal. The flexibility within the beam group comes from the programmable attenuator settings $A_1$ through $A_N$, which can be used to tailor the EIRP distribution across the user beams 524a, . . . 524N in any manner desired. Furthermore, the EIRP distribution can be changed at any time during the lifetime of the satellite. The ability to customize the EIRP distribution across the user beams 524a, . . . 524N allows the forward link capacity to be distributed in any proportion desired, for example, by short messages from a ground-based controller.

Figure 6:
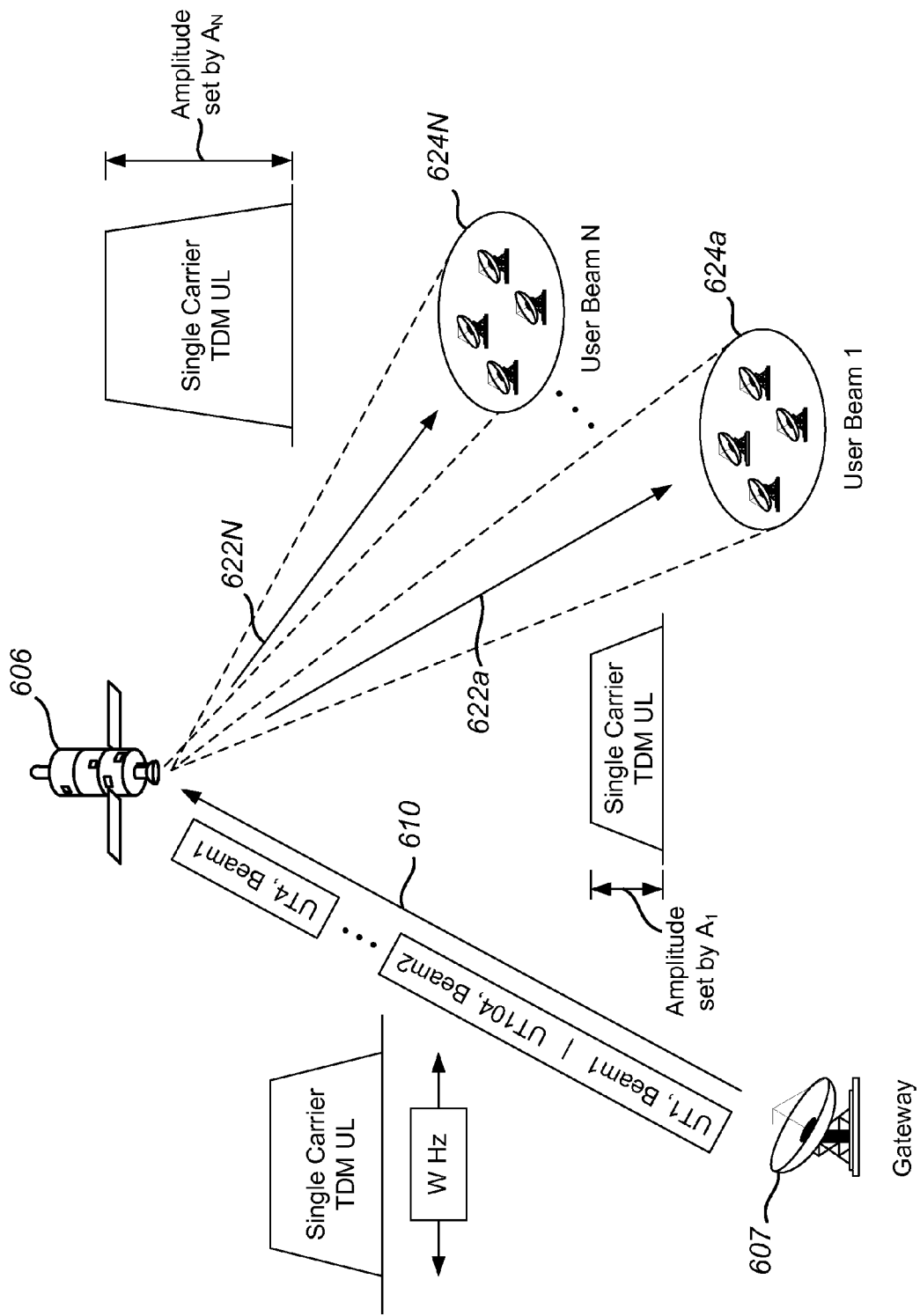
FIG. 6 is a simplified diagram of an uplink signal that includes a single time division multiplexed (TDM) carrier that is downlinked to a plurality of user beams in accordance with an embodiment of the invention.

In an embodiment, the uplink signal from the GW may be a single carrier that occupies the entire spectrum of the beam. This is depicted in FIG. 6, which shows a simplified diagram of an uplink signal 610 that includes a single time division multiplexed (TDM) carrier. The TDM carrier is transmitted by a GW 607 to a satellite 606. The satellite receives the TDM carrier and downlinks the carrier in signal 622a to user beam 624a and in signal 622N to user beam 624N. The UT's in each beam may process only the portion of the carrier that is addressed to them. The carrier downlinked to user beam 624N is illustrated as being taller than the carrier downlinked to signal 624a to represent different levels of transmit power. The transmit power may be distributed between the beams 624a, . . . 624N as explained above with regard to FIG. 5. In this example, all of the data is downlinked to each of the user beams 624a, . . . 624N even though only a subset of the data is addressed to UT's in any given beam.

Figure 7:
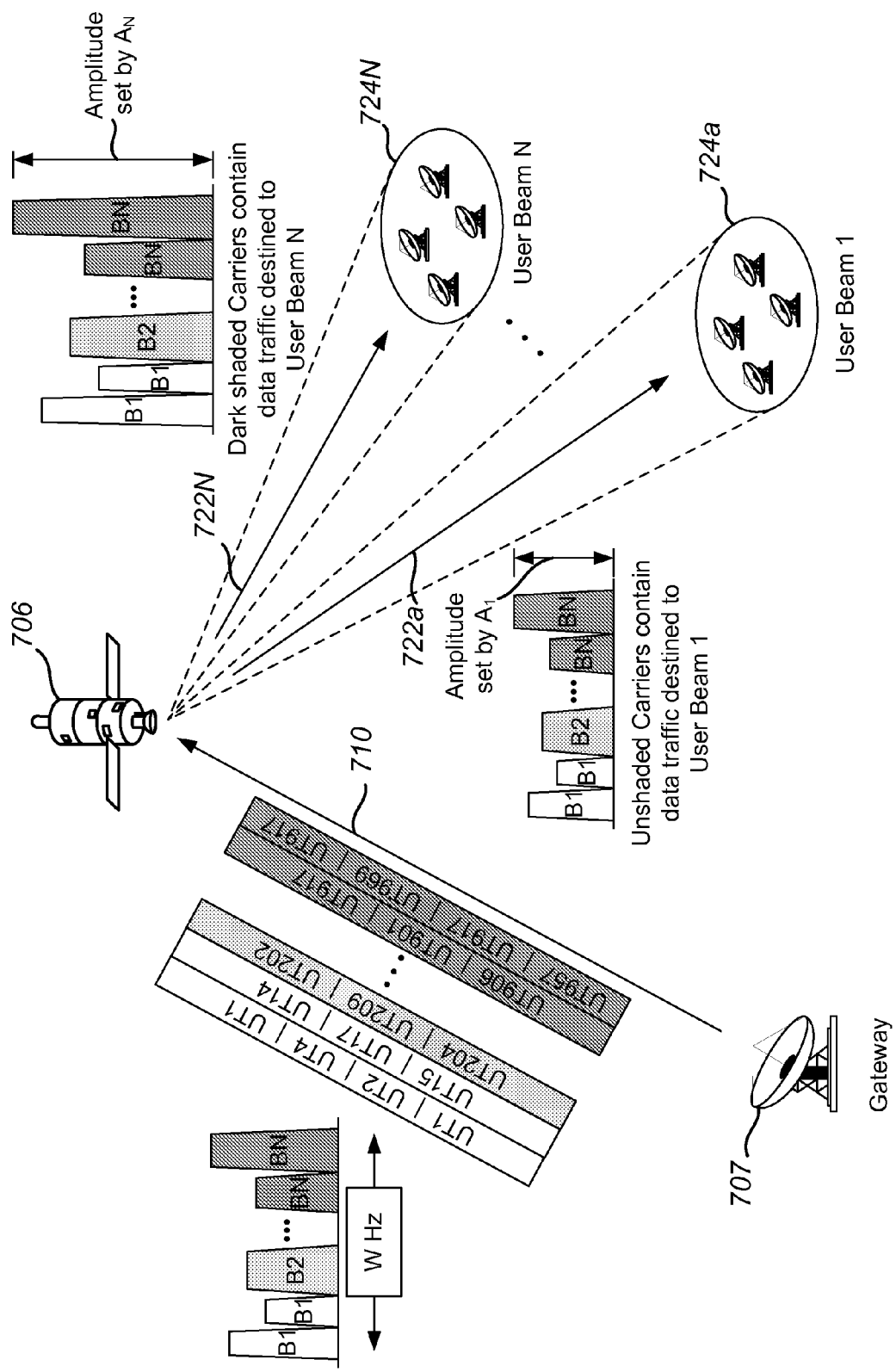
FIG. 7 is a simplified diagram of an uplink signal that includes multiple frequency division multiplexed (FDM) carriers that are downlinked to a plurality of user beams in accordance with an embodiment of the invention.

In another embodiment, the uplink signal from the GW can include multiple carriers that each occupy portions of the spectrum. This is depicted in FIG. 7, which shows a simplified diagram of an uplink signal 710 transmitted by a gateway 707. The uplink signal includes multiple frequency division multiplexed (FDM) carriers that are received by satellite 706 and downlinked to a plurality of user beams 724a, . . . 724N. The FDM carriers are shown as having different widths and different heights representing different bandwidths and different levels of power, respectively. Each carrier may be associated with a particular user beam and contain data addressed only to UT's in that beam. In this example, there may be more than one carrier associated with each beam. Within a single carrier, data to multiple UT's may be multiplexed together and each UT may process only the data in the carrier that is addressed to itself. In this multi-carrier scenario, the FDM carriers may be downlinked in signals 722a, . . . 722N to user beams 724a, . . . 724N respectively. Only a subset of the carriers may be used within a particular user beam. The carrier downlinked in signal 722N is illustrated as being taller than the carrier downlinked in signal 722a to represent different levels of transmit power. Each UT in a beam may be assigned to receive data on a single carrier.

Hybrids of the two previous approaches also exist. In one such example, multiple carriers are employed where each UT is assigned to receive traffic on one of the carriers. However, individual carriers might service UT's in more than one of the beams in a beam group. This approach is similar to the FDM approach in that there are multiple carriers in the uplink signal from the GW. This approach is also similar to the TDM approach in that a carrier can service UT's that can be within different beams in a beam group.

An artifact of flexible EIRP allocation amongst beams is that UT's in different beams may have different downlink carrier to noise ratios (C/No). In a single carrier TDM system, this may result in UT's with different receive signal-to-noise ratios (SNR or Es/No). This same scenario can also be true in multi-carrier situations. This difference in SNR between UT's is similar to the difference in SNR between UT's within a single beam of a TDM forward link in a conventional system. In a conventional system, the UT SNR difference may result from variation in satellite antenna gain over a beam as well as downlink rain fade over a subset of the beam area. In conventional systems, Adaptive Coding and Modulation (ACM) is commonly employed to mitigate the SNR differences. In an ACM system, the modulation and FEC code rate for each UT is uniquely selected based on its SNR. Data to each UT is transmitted with its selected code rate and modulation to allow the UT to demodulate the data. This same ACM approach will work with the SNR variations for UT's in different beams within the same beam group. It may be helpful to consider the N beams within a beam group as a single large beam with a potentially large variation of SNR. From this perspective, it is easy to see how conventional ACM techniques can be applied. One of ordinary skill in the art would recognize may variations, modifications, and alternatives in light of the present disclosure.

In an embodiment, the user beams may be spatially isolated to reduce multipath interference. Without spatial isolation, a multipath situation may arise in which a downlink transmission to a UT may use different paths through two or more different user beams. The multiple paths can result in multipath interference. When the user beams within a beam group are spatially separated, the secondary and subsequent paths are significantly attenuated relative to the primary path. In this scenario, multipath interference will be small or non-existent.

Flexible Forward Links

With reference to FIG. 5, the following notation may be used:
- s(t) may be the input signal to the 1:N power divider 526. This is the system input. The total input signal power can be determined using the equation:

$$E[|s(t)|^2] = P_s \quad (3)$$

- $x = [x_1(t), x_2(t), \ldots, x_N(t)]^T$ may be the vector of inputs to the hybrid matrix 532.
- $z = [z_1(t), z_2(t), \ldots, z_N(t)]^T$ may be the vector of outputs of the hybrid matrix 532.
- $y = [y_1(t), y_2(t), \ldots, y_N(t)]^T$ may be the vector of outputs of the inverse hybrid matrix 534. This is the system output.
- H may represent an N×N hybrid matrix.
- $H^{-1}$ may represent an N×N inverse hybrid matrix.
- $HH^{-1} = I_N$, may represent an N×N identity matrix.
- G may represent an N×N diagonal matrix representing the N parallel HPA's 518a, ... 518N. For simplicity, the same gain and phase shift can be assumed for the HPA's 518a, ... 518N so G can be represented as $G = \sqrt{g} \cdot I_N$, where g is the HPA power gain, and the common phase shift through the HPA's 518a, ... 518N can be ignored. Note that in practice, slight differences in gain and phase shift affect C/I by introducing cross-talk across the channels.

The components of the hybrid matrix H can be given by:

$$h_{n,m} = \frac{1}{\sqrt{N}} \exp\left(\frac{j\pi(m-1)(2n-N-1)}{N}\right) \quad (4)$$

where n indicates the row index and ranges from 1 to N and m indicates the column index and ranges from 1 to N. Successive elements in a row increase in phase by an amount 180· (2n−N−1)/N degrees, so for a 4×4 hybrid matrix, the phase shifts are −135, −45, +45, and +135 degrees for rows 1, 2, 3, and 4 respectively. The components of the inverse hybrid matrix are just the conjugate transpose of the hybrid matrix. Matrix multiplication can be used to verify that $HH^{-1} = I_N$.

The hybrid matrix input vector, x, can be expressed in terms of the input signal s(t) using the equation:

$$x = \left[ \frac{s(t-D_1)}{\sqrt{A_1}} \quad \frac{s(t-D_2)}{\sqrt{A_2}} \quad \cdots \quad \frac{s(t-D_N)}{\sqrt{A_N}} \right]^T \quad (5)$$

The hybrid matrix output may be given by the matrix equation:

$$y = H^{-1} G H x \quad (6)$$

In an embodiment, the phase and gain of the HPA's 518a, ... 518N are matched, and the output signals to the Tx antennas 520a, ... 520N are given by:

$$y = \sqrt{g} \, x = \left[ \sqrt{\frac{g}{A_1}} s(t-D_1) \quad \sqrt{\frac{g}{A_2}} s(t-D_2) \quad \cdots \quad \sqrt{\frac{g}{A_N}} s(t-D_N) \right]^T \quad (7)$$

These signals may be an amplified and delayed replica of the input signal s(t), each with its own selectable attenuation $A_n$.

The power at the input to each HPA 518 is the power of the components of the vector z=Hx. For a 2×2 system (e.g., N=2), the inputs to the HPA's (e.g., HPA's 518a, ... 518N) are:

$$z = Hx = \begin{bmatrix} 1 & -j \\ 1 & j \end{bmatrix} \begin{bmatrix} x_1(t) \\ x_2(t) \end{bmatrix} = \begin{bmatrix} x_1(t) - jx_2(t) \\ x_1(t) + jx_2(t) \end{bmatrix} \quad (8)$$

Using (5) for x and setting $D_1 = D_2 = 0$ (no delay elements), z becomes:

$$z = Hx = \begin{bmatrix} \frac{1}{\sqrt{A_1}} - j\frac{1}{\sqrt{A_2}} \\ \frac{1}{\sqrt{A_1}} + j\frac{1}{\sqrt{A_2}} \end{bmatrix} s(t) \quad (9)$$

In this case, the power of both HPA input signals is the same and equal to $1/A_1 + 1/A_2$ regardless of the relative attenuation values. Both HPA's (e.g., HPA's 518a, ... 518N) will be driven at the same level and result in the same output level. However, this property does not hold for values of N greater than 2 unless the input signals $x_n(t)$ are all uncorrelated.

The values of the delay $D_n$ can be selected such that the inputs signals to the hybrid matrix 532 are uncorrelated. As an example, a set of delays $D_n=(n-1)\Delta$, where $\Delta$ is the symbol interval ($T_{sym}$), may be used. If the delay elements in the satellite cannot be precisely set, or if a symbol rate cannot be guaranteed to be a particular value, a value of $D_n$ that is greater than or equal to about twice the maximum anticipated symbol period $T_{max}$ can be used. This will provide a correlation of less than 10% for any symbol rate greater than $1/T_{max}$. With uncorrelated inputs, the power at the input to each HPA 518 is equal and can be shown to be:

$$E[|z_n|^2] = \frac{1}{N}P_s\sum_{m=1}^{N}\frac{1}{A_m} = \frac{P_s}{NA_p} \tag{10}$$

where $A_p$ is the parallel combination of all N attenuator values and is shown by:

$$A_p = \left(\frac{1}{A_1} + \frac{1}{A_2} + \ldots + \frac{1}{A_N}\right)^{-1} \tag{11}$$

For N=2, it is not necessary to provide a delay to maintain equal power at both HPA inputs. However, it still may be desirable to do so since de-correlating the inputs to the hybrid matrix makes the MPA less sensitive to phase and gain imbalances. The MPA may comprise the parallel HPA's (e.g., HPA's 518a, ... 518N), the hybrid matrix 526, and the inverse hybrid matrix 534.

In an embodiment, the HPA's 518a, ... 518N may operate at a target output backoff (OBO) from their maximum output power capability. The OBO may be selected based on a tradeoff of output power and linearity. Higher output power results in more EIRP but may also causes intermodulation distortion (intermods). Typical target OBO's for multi carrier signals may be in the range of about 2 to 5 dB. The target OBO may map to a target input power $P_{in}$, and the attenuation values may be set such that the power into each HPA 518 is equal to the desired value $P_{in}$. Setting equation (10) equal to $P_{in}$ provides:

$$A_p = \frac{1}{N}\frac{P_s}{P_{in}} \tag{12}$$

With the attenuator constraint provided by equation (12), an output power of a single HPA 518 is $gP_{in}$, and a total output power of all N HPA's 518a, ... 518N is $NgP_{in}$. For lossless hybrid matrices, total power delivered to the N user beams 524a, ... 524N will be the total power out of the HPA's 518a, ... 518N (or $NgP_{in}$). From equation (7), it can be seen that the power of the $n^{th}$ output port of the inverse hybrid matrix 534 is $gP_s/A_n$. The fraction of the total power (sum of all HPA 518a, ... 518N outputs) given the $n^{th}$ beam is then:

$$\alpha_n = \frac{gP_s/A_n}{NgP_{in}} = \frac{P_s}{P_{in}}\frac{1}{NA_n} \tag{13}$$

Using equation (10) for $P_{in}$ and inserting into equation (13) yields a fraction of the total power allocated to user beam n as a function of the attenuator settings:

$$\alpha_n = \frac{A_p}{A_n} \tag{14}$$

This applies if the constraint in equation (12) is respected. In practice, the hybrid matrix 532 is typically not lossless and has a small insertion loss. This loss may be applied against both the total output power and the output power of each user beam such that calculation of $\alpha_n$ in equation (14) is unaffected.

In equation (14), $\alpha_n$ may be a power sharing factor for user beam n and a sum of all $\alpha_n$ values should equal 1. From equation (14) it can be seen that an effect of the attenuation values is to distribute the power across user beams within a beam group according to weight $\alpha_n$. When all attenuation values are set to the same value ($\alpha_n=A$), then $A_p=A/N$ and thus $\alpha_n=1/N$ for all user beams. This results in equal power sharing across all beams in the beam group. The power sharing may result in an EIRP reduction of N for each beam. This may seem undesirable, but note that the effective coverage area is increased by a factor of N (for N equal size beams), so the antenna directivity must necessarily decrease by the same factor. Hence, the reduction is an artifact of the increased coverage area.

When $A_n$ is set to $A_p$ and all other attenuators are set to large attenuation values, $\alpha_n=1$ and all other values of the power sharing factor are extremely small (nearly zero). Thus, beam n has the full power of all N HPA's 518a, ... 518n and all other beams have essentially no power. This situation corresponds to turning beam number n "on" and all other beams "off".

For an arbitrary set of selected power sharing fractions $\alpha_1 \ldots \alpha_N$, the corresponding attenuation values can be determined as $A_n=A_p/\alpha_n$. $A_p$ is the desired parallel combination of all attenuation values as determined by equation (12). This yields desired sharing fractions and respects the constraint of equation (12).

Figure 8A:
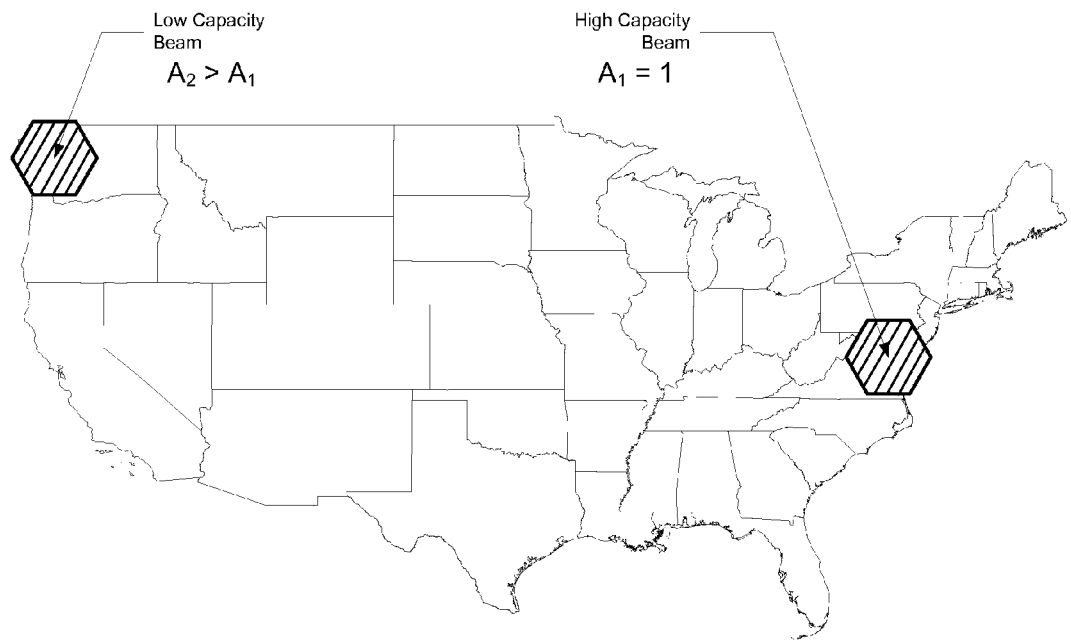
FIGS. 8A-8B are simplified diagrams illustrating beam capacity adjustments according to an embodiment of the present invention.
Figure 8B:

FIGS. 8A-8B are simplified diagrams illustrating beam capacity adjustments according to an embodiment of the present invention. FIG. 8A illustrates beam capacity adjustment for East Coast Primetime according to an embodiment. A high capacity beam and a low capacity beam are shown as individual beams included within a single beam group spanning the continental United States. Only these two representative beams are shown in the figure, but other beams may exist in the same beam group. The high capacity beam is associated with a coverage area located along the East Coast. On the other hand, the low capacity beam is associated with a coverage area located along the West Coast. This corresponds with the usage of bandwidth during what are peak hours for the East Coast and non-peak hours for the West Coast.

FIG. 8B illustrates beam capacity adjustment for West Coast Primetime according to an embodiment. This figure is similar in many respects to FIG. 8A. However, the power levels of the West Coast beam and the East Coast beam have swapped. Now, the high capacity beam is associated with a coverage area located along the West Coast. The low capacity beam is associated with a coverage area located along the East Coast. This corresponds with the usage of bandwidth during what are peak hours for the West Coast and non-peak hours for the East Coast.

The high capacity beam and the low capacity beam may be realized by remotely controlling attenuators aboard the spot beam satellite, in the manner described previously. For example, the high capacity beam may result from setting a corresponding attenuator $A_1$ at a relatively low attenuation value (e.g., $A_1=1$). At the same time, the low capacity beam may result from setting a corresponding attenuator $A_2$ at a relatively high attenuation value (e.g., $A_2>A_1$). The high capacity beam has greater power and thus more potential capability for data transmission. The low capacity beam has lower power and thus less potential capability for data transmission. In either case, use of adaptive modulation and coding (ACM) allows for efficient use of the available capacity.

FIGS. 8A-8B thus portray the manner in which capacity may be flexibly allocated among spot beams based on usage patterns. When it is East Coast Primetime, the spot beam satellite may be configured to provide spot beams as illustrated in FIG. 8A. A few hours later, when it is West Coast Primetime, the spot beam satellite may be configured differently, to provide spot beams as illustrated in FIG. 8B. One of ordinary skill in the art would recognize many variations, modifications, and alternatives in light of the present application.

It should be noted that the methods and apparatuses discussed throughout this specification are provided merely as examples. Various embodiments may omit, substitute, or add various procedures or components as appropriate. For instance, it should be appreciated that features described with respect to certain embodiments may be combined in various other embodiments. Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may be adapted to perform the necessary tasks. The term "computer-readable medium" includes, but is not limited to, portable or fixed storage devices, optical storage devices, sim cards, other smart cards, and various other non-transitory mediums capable of storing, containing, or carrying instructions or data.

Having described several embodiments, it will be recognized by those of skill in the art that various modifications, alternative constructions, and equivalents may be used without departing from the spirit of the invention. For example, the above elements may be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for distributing transmit power of a forward link signal in a spot beam satellite communication system, the method comprising:
   receiving a forward link signal from a gateway;
   generating multiple versions of the forward link signal;
   selectively attenuating at least one of the multiple versions of the forward link signal;
   after the step of selectively attenuating, amplifying the multiple versions of the forward link signal using a multi-port amplifier (MPA), to generate multiple amplified signals, wherein amplifying the multiple versions of the forward link signal comprises:
      processing the multiple versions of the forward link signal using a hybrid matrix, to generate a plurality of hybrid-matrix-processed signals;
      amplifying the plurality of hybrid-matrix-processed signals using a plurality of high power amplifiers (HPA's), to generate HPA-amplified signals; and
      processing the HPA-amplified signals using an inverse hybrid matrix, to generate the multiple amplified signals;
   transmitting the multiple amplified signals to multiple spot beams, each spot beam corresponding to a spot beam coverage area.

2. The method of claim 1 wherein the multiple versions of the forward link signal are de-correlated before the amplifying step.

3. The method of claim 2 wherein de-correlating the multiple versions of the forward link signal comprises delaying at least some of the multiple versions of the forward link signal.

4. The method of claim 1 wherein the step of selectively attenuating uses attenuation values received from a source remote from the spot beam satellite, after the spot beam satellite has been deployed in space.

5. The method of claim 1 wherein the step of selectively attenuating determines a distribution of the transmit power of the multiple amplified signals in response to predicted offered traffic load.

6. A spot beam satellite configured to allow dynamic distribution of transmit power across forward link signals, comprising:
   an antenna configured to receive a forward link signal from a gateway;
   a 1-to-N splitter configured to generate multiple versions of the forward link signal received from the gateway;
   one or more attenuators configured to attenuate the multiple versions of the forward link signal received from the gateway;
   a multi-port amplifier (MPA) configured to amplify the multiple versions of the forward link signal received from the gateway to generate one or more amplified signals, wherein the MPA comprises:
      a hybrid matrix configured to process the multiple versions of the forward link signal received from the gateway, to generate a plurality of hybrid-matrix-processed signals;
      one or more high power amplifiers (HPA's) configured to amplify the plurality of hybrid-matrix-processed signals, to generate HPA-amplified signals; and
      an inverse hybrid matrix configured to process the HPA-amplified signals, to generate the one or more amplified signals;
   a transmitter configured to transmit the one or more amplified signals as one or more spot beams, each spot beam corresponding to a spot beam coverage area.

7. The spot beam satellite of claim 6 further comprising one or more de-correlation elements configured to de-correlate the multiple versions of the forward link signal received from the gateway.

8. The spot beam satellite of claim 7 wherein the one or more de-correlation elements are configured to delay at least one of the multiple versions of the forward link signal to de-correlate the multiple versions of the forward link signal.

9. The spot beam satellite of claim 6 wherein the one or more attenuators are controlled to respond to predicted offered load.

10. The spot beam satellite of claim 6 further comprising:
    a receiver configured to receive attenuation values from a location away from the spot beam satellite; and
    a processor configured to set an attenuation of the one or more attenuators based on the attenuation values, wherein the receiver is configured to receive the attenuation values after the spot beam satellite has been deployed in space.

* * * * *